US008108684B2

(12) United States Patent
Addy

(10) Patent No.: US 8,108,684 B2

(45) Date of Patent: Jan. 31, 2012

(54) METHOD AND SYSTEM FOR CONTROLLING A SECURITY SYSTEM USING NEAR FIELD COMMUNICATION

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 1298 days.

(21) Appl. No.: 11/546,865

(22) Filed: Oct. 12, 2006

(65) Prior Publication Data

US 2008/0092230 A1 Apr. 17, 2008

(51) Int. Cl.
*G06F 21/20* (2006.01)
*G06F 7/04* (2006.01)
*G06F 17/30* (2006.01)

(52) U.S. Cl. ............................. 713/182; 713/185; 726/2

(58) Field of Classification Search .................. 713/182, 713/185; 726/2
See application file for complete search history.

(56) References Cited

U.S. PATENT DOCUMENTS

| | | | | |
|---|---|---|---|---|
| 2003/0034390 | A1 * | 2/2003 | Linton et al. | 235/382 |
| 2003/0065940 | A1 * | 4/2003 | Brezak et al. | 713/201 |
| 2004/0078601 | A1 * | 4/2004 | Tengwall et al. | 713/201 |
| 2004/0116074 | A1 | 6/2004 | Fujii et al. | |
| 2004/0117651 | A1 | 6/2004 | Little et al. | |
| 2004/0130442 | A1 * | 7/2004 | Breed et al. | 340/443 |
| 2005/0064814 | A1 | 3/2005 | Matsuo et al. | |
| 2005/0077356 | A1 | 4/2005 | Takayama et al. | |
| 2005/0273444 | A1 * | 12/2005 | Delgrosso et al. | 705/76 |
| 2006/0044153 | A1 | 3/2006 | Dawidowsky | |
| 2006/0090079 | A1 * | 4/2006 | Oh et al. | 713/186 |
| 2006/0176146 | A1 * | 8/2006 | Krishan et al. | 340/5.53 |
| 2006/0238337 | A1 * | 10/2006 | Minassian et al. | 340/539.23 |
| 2006/0284727 | A1 * | 12/2006 | Steinke | 340/10.31 |
| 2007/0001814 | A1 * | 1/2007 | Steinke et al. | 340/10.31 |
| 2008/0014989 | A1 * | 1/2008 | Sandegard et al. | 455/557 |
| 2008/0229400 | A1 * | 9/2008 | Burke | 726/7 |

FOREIGN PATENT DOCUMENTS

| | | |
|---|---|---|
| DE | 3514660 | 10/1986 |
| DE | 3805453 | 8/1989 |
| DE | 19961619 | 6/2001 |
| EP | 1583041 | 10/2005 |
| WO | WO 97/39553 | 10/1997 |
| WO | WO 03/062027 | 7/2003 |

* cited by examiner

*Primary Examiner* — Michael Simitoski
(74) *Attorney, Agent, or Firm* — Husch Blackwell

(57) ABSTRACT

A security system control system using a host object with a near field communication device and a target object with a near field communication device. The target object broadcasts a carrier signal to the host object. Using the near field communication device, the host object modulated identification information on the carrier signal and broadcasts the modulated signal. The target object demodulates the signal to determine if a user associated with the identification information is authorized to perform the intended control function. The target object determines the intended control function based upon a detection criterion. The target object causes the intended control function to be performed if the associated user is authorized to control the intended control function such as to arm or disarm the security system. The identification information can expired after a predetermined period of time. The target object updates the identification information after expiration.

20 Claims, 9 Drawing Sheets

400

| ID | NAME | FUNCTION | EXPIRATION | PASS CODE |
|---|---|---|---|---|
| | | | | |

FIG. 4A

| FUNCTION | THRESHOLD VALUE |
|---|---|
| | |

420

FIG. 4B

METHOD AND SYSTEM FOR CONTROLLING A SECURITY SYSTEM USING NEAR FIELD COMMUNICATION

BACKGROUND OF THE INVENTION

1. Field of the Invention

The invention relates generally to a security system and communication systems. In particular, this invention relates to controlling a security system using a remote object by the transmission of radio frequency signals to a target device, the target device includes a receiver and transmitter capable of receiving and transmitting radio frequency signals.

2. Background

Security systems, in both a residential and commercial environment are well known and commonplace as people seek to protect themselves and their property. A security system includes any life, safety, and property protection system. A security apparatus including a user interface keypad, control panel and a plurality of sensors are installed in a residents or commercial building. Both an installer and an owner of the security apparatus can use the user interface keypad to control, configure and manage the security apparatus. Such control functions include arming the security apparatus upon leaving the environment and disarming the security apparatus upon entering the environment.

A change in status of the security apparatus, e.g., arming and disarming, is effectuate by entering a personal identification and/or passcode into the user interface keypad by depressing keys on the keypad. A passcode is assigned for each person or person(s) that have authorization or credentials to change the status. The passcode can be stored in the memory of the user interface keypad or communicated to a system controller via a wired bus or by wireless communications. If the entered passcode matches the store passcode, then the keypad transmits the desired status change to the control panel using a data bus, or the passcode can be transmitted using wireless communications.

Alternatively, a user can have a remote transmitter, frequently provided in a remote control keypad device or a keyfob kept on a user's keyring to change the status of the security apparatus, such as arming or disarming the security system. The transmitter can be a radio frequency transmitting apparatus, in which case the user can be remote from the user interface device, i.e., not in close proximity to where the user interface keypad is located. In another alternative, the transmitter may be an infrared transmitter. However, when using either a wireless keypad or transmitter, the user may have to enter an identification or passcode prior to being able to change the status of the security apparatus.

Using a passcode has several drawbacks. The passcode can be forgotten or lost, creating a security risk. If the passcode is lost, the code must be immediately changed. Additionally, typically a security apparatus only provides small amount of time to enter the disarming passcode, the user is rushed when entering the passcode, resulting is errors when entering the passcode, which in turn results is false alarms. Furthermore, entering a passcode might be difficult for the user if the user is carrying anything. Additionally, since remote transmitters operate a VHF and UHF frequencies and the range of operating is such that the transmitted information can be overheard by malicious eavesdroppers using "code grabbing" equipment.

Accordingly, there is a need to provide a method and system capable of changing the status of the security apparatus is a quick and secure manner.

BRIEF SUMMARY OF THE INVENTION

The present invention describes a solution that allows a user to change the status or a function of the security system by bringing a host object with a near field communication device in close proximity of a target object with a near field communication device. The present invention takes advantage of the bidirectional characteristics of near field communication.

A security system control system comprising a host object having a near field communication device compatible with ISO/IEC 18092 and a target object having a second near field communication device associated are disclosed. When the host object is brought within a preset distance to the target object, the near field communication device in the host object modulates a radio frequency field including identification information for the near field communication device and access credentials to the target objection. The target object, using information stored in memory determines if the host object is authorized to change the status of the security system and causes the status of the security system to change if the host object is authorized to initiate the particular change.

The type of change is determined by a measurement of a period of time that the host object is brought within a preset range. The host object can arm or disarm the security system. Alternatively, bringing the host object into the range can "toggle" the status of the security system, i.e., if it is armed, it changes status to disarmed and vice versa.

The host object can be any object capable of having a near field communication device embedded therein, such as a cellular telephone, PDA or a keyfob. The target object can be a user interface device or an arming and disarming station.

The target object is located near the entranceway of a residential or commercial property. The system can have multiple target objects. If multiple target objects are used, one target object is selected as a main target object for assigning the access credentials and configuring the control system, such as determining time thresholds, range, and control functions and uploading this information to the host object. The remaining target objects will determine if a desired change is authorized based upon information broadcast from the host object.

Also disclosed is a method for controlling a security system using a radio frequency communication signal transmitted from a host object. The method includes detecting a presence of the radio frequency communication signal. The radio frequency communication signal includes at least an access credential. The method further includes determining the access credential, matching the determined access credential with a specific authorized user from a list of authorized users, detecting a type of modification to a function of the security system based upon a predetermined detection criterion and determining if the specified authorized user is authorized to perform the detected type of modification and performing the modification.

The control method further comprises converting said access credential into a user passcode and transmitting the user passcode to a control panel. The access credential expires after a preset time period.

The predetermined detection criterion is a time threshold. The time threshold is a period of time where the host object is brought within a preset range of a target object. The host object can arm or disarm the security system.

Also disclosed is a method of configuring a security system for receiving remote control signals from a host object. The method includes programming a list of authorized users, associating an access credential with each of the authorized users, assigning a control authority for a function to each of the authorized users, and determining a detection criterion for each function.

The method further includes assigning an expiration time for each of the access credentials.

The method further includes broadcasting the list of authorized user, the access credential, the control authority for a function to each of the authorized users and the detection criterion for each function to a host object for storing, when the host object is brought within a preset range of the target object. This preset range can be controlled in advance and preferably is within approximately 10 cms.

BRIEF DESCRIPTION OF THE DRAWINGS

These and other features, benefits and advantages of the present invention will become apparent by reference to the following text and figures, with like reference numbers referring to like structures across the views, wherein:

FIGS. 4A and 4B illustrate example of databases created in memory in accordance with the invention;

DETAILED DESCRIPTION OF THE INVENTION

Figure 1:
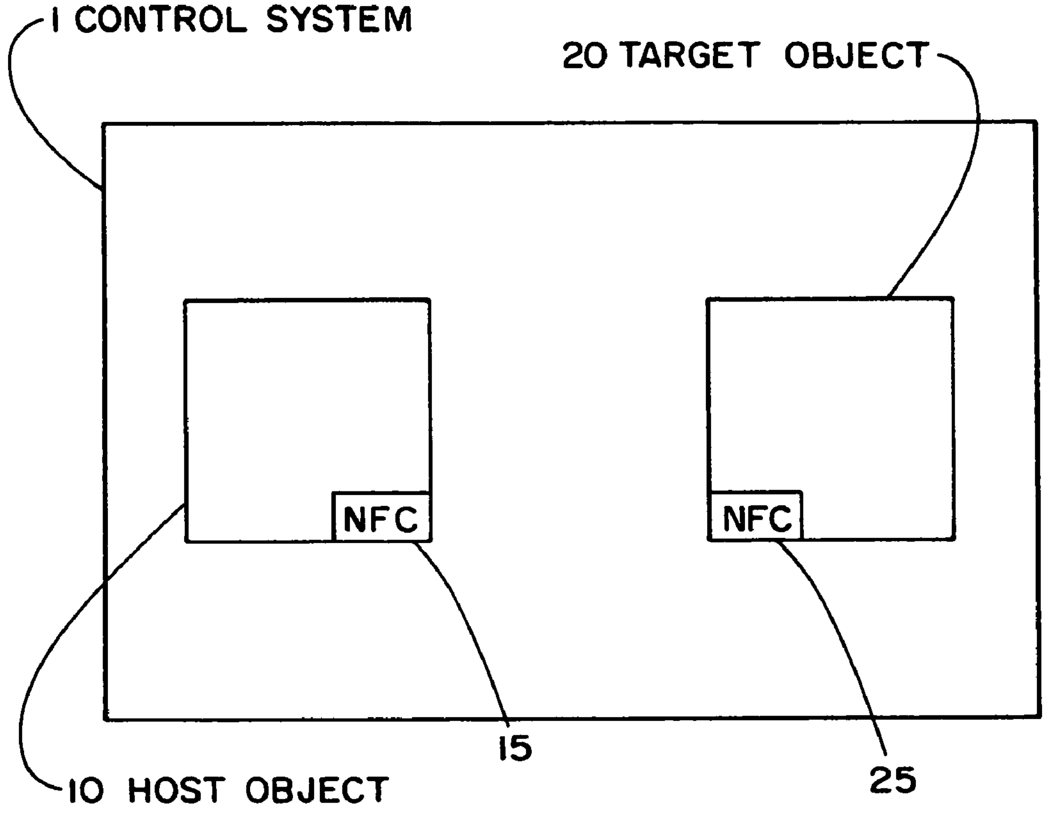
FIG. 1 is a diagram showing a configuration of a control system according to the invention.

FIG. 1 illustrates a control system for controlling a status of a security system according to an embodiment of the invention. As illustrated the control system 1 includes a host object 10 and a target object 20. The host object 10 includes a near field communication device 15. The host object 10 can be any object or device that is capable of having a near field communication device attached, embedded, installed, or used in conjunction with a local installed security system and is portable. For example, but not limited to, a keycard, a cellular telephone, a PDA, a laptop computer, wristwatch, pencil, pen and a keyfob. The target object 20 also includes a near field communication device 25. The target object 20 can be a user interface keypad or device that is associated with security control panel or a separate arming and disarming station. Typically, the target object 20 will be located near an entrance or a door such that the user can arm or disarm the security system when entering or leaving the residential or commercial property.

The near field communication devices 15 and 25 communicate based upon electromagnetic induction using a carrier wave having a single frequency. The frequency of the carrier wave will be within an unregulated 13.56 MHz frequency band.

Near field communication devices 15 and 25 can communicate using an active or passive mode. In passive mode an initiator device provides a carrier field and the responding device replies by modulating the existing field. The responding device is powered by radiation in the carrier field. In active mode, both devices communicate by generating their own carrier fields and include power supplied. In the preferred embodiment of the invention, the near field communication device 15 in the host object 10 is a passive device. Additionally, the near field communication devices 15 and 25 can transmit data at one of several predetermined data rates. The date rates can be 106 kbit/s. 212 kbit/s or 424 kbit/s. Since the amount of data that needs to be communicated is small, in accordance with the invention the data rate can be 106 kbits/s, i.e., the lowest rate.

Each near field communication device 15 includes a unique identifier that allows the device to be uniquely identified. The unique identifier is stored in memory. When an initiator queries the device, the near field communication device 15 modulates its unique identifier onto the carrier signal. This allows for identification of the near field communication device 15 by the initiator when a host object 10 is brought within a preset range of the target object 20. The preset range can be controlled or varied by reducing the power of the initial carrier signal broadcast from the target object 20. Additionally, selecting the size and type of transmitting antenna for the target object can control the preset range. In the preferred embodiment, the transmitting power is set and type of transmitting antenna is selected to set the preset range to be very short, i.e., approximately 10 cm.

In accordance with the invention, the host object 10 can be uniquely identified by it near field communication device 15. Using this association, specific access credentials, authorizations and functionality can be associated with a specific host object 10 based upon the unique identifier of its near field communication device 15.

Figure 2:
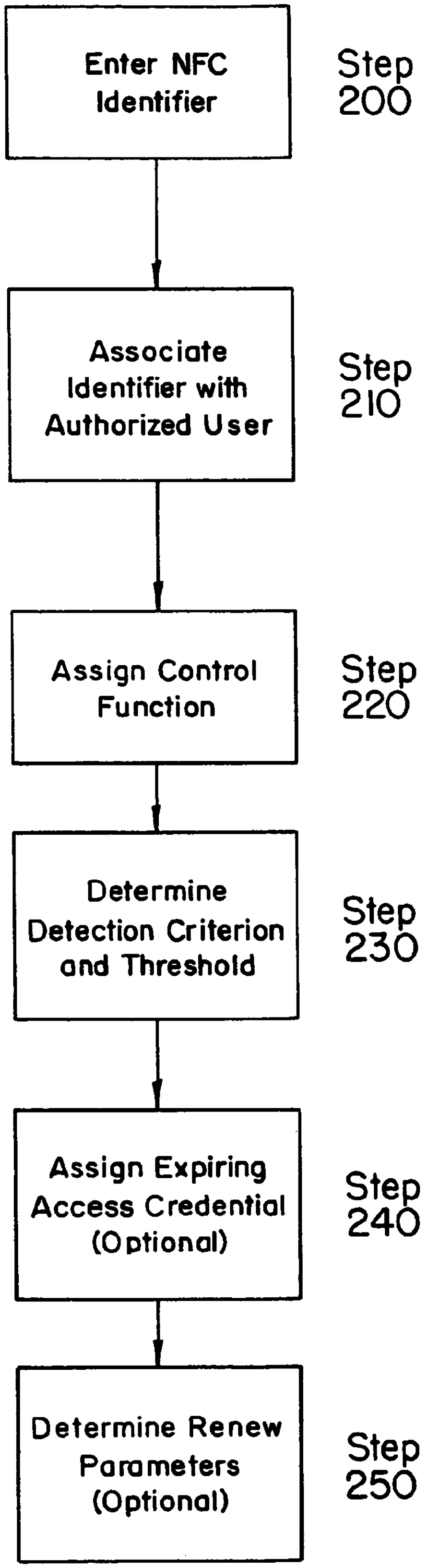
FIG. 2 is a flow chart for the method of programming the target object in accordance with the invention.

FIG. 2 illustrates a configuration method for associating the host object 10 with access credentials, authorizations and functionality. The configuration can be performed by an installer of the security system, an owner of the security system, a security officer of a commercial business (hereinafter collectively references as "the user").

Figure 3:
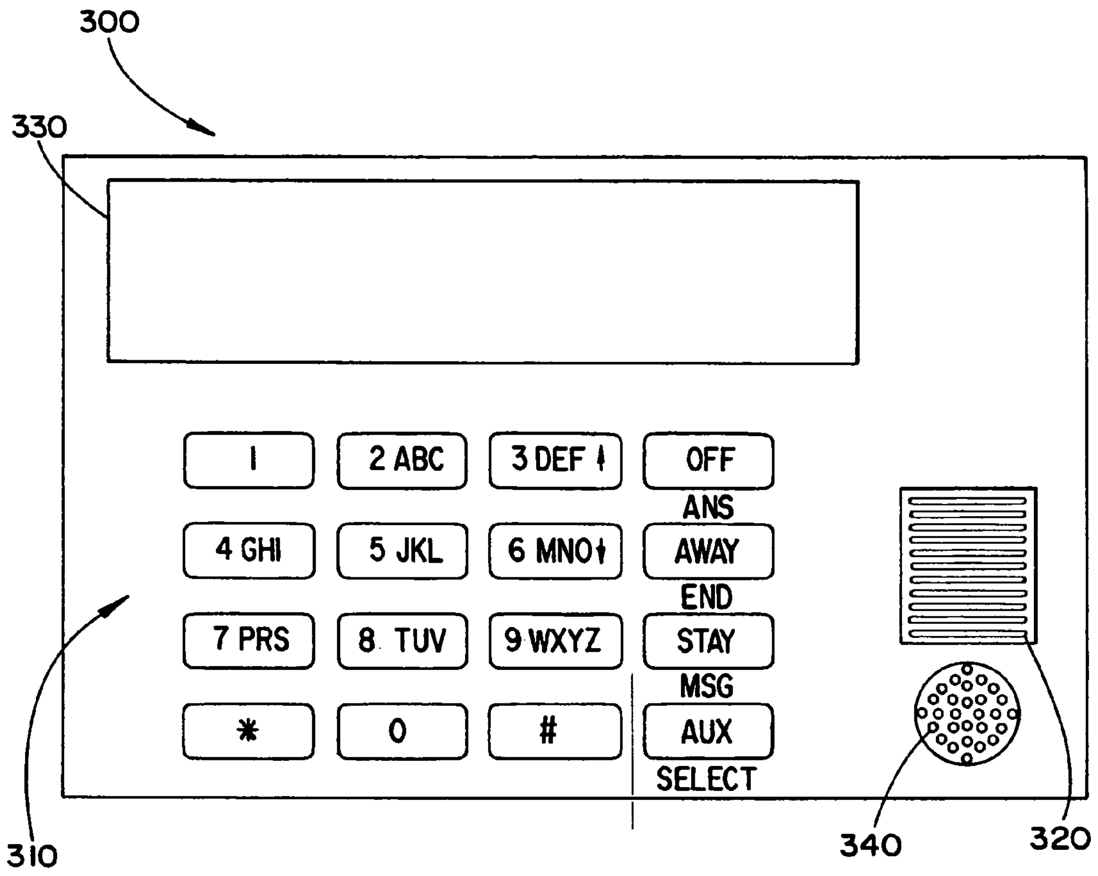
FIG. 3 illustrates an example of a user interface keypad used for programming the control system in accordance with the invention.

The user can configure or program the security system to recognize the host update using a user interface device. FIG. 3 illustrates an example user interface device 300 according to the invention. The user interface device 300 can be provided, e.g., as a peripheral to the main control panel, or as part of the main control panel. The user interface device 300 includes a user input component such as a keypad 310 and/or microphone 320 for speech recognition in a voice-activated system, and a user output component such as a display 330 and/or speaker 340. The display 330 may be a multi-line, multi-character LCD display, for instance. The user interface device 300 can also include the near field communication device 25 if the user interface device 300 is the target device 20.

The user will have to enter a programming mode. In programming mode, the user will have to record or enter the unique identifier for the host object 10 (near field communication device), at step 200. There are two options for entering the unique identifier. In one embodiment, the user can bring the host object 10 in close proximity of the target object 20. The near field communication device 25 in the target object 20 will receive the modulated carrier signal with the unique identifier. The near field communication device 25 will filter out the carrier signal and demodulate the signal. As a result the unique identifier will be output from the near field communication device 25. In an embodiment, where the target object is the user interface device 300, the user interface device 300 will store the unique identifier directly from the near field communication device 25. In an embodiment, where the target object 20 is an arming and disarming station, the unique identifier might be sent to the user interface device 300, either via a wired communication or wirelessly for access processing. The unique identifier is stored in memory. For example, the unique identifier can be the International Mobile Equipment Identifier (IMEI) used in GSM compliant phones, or the Mobile Equipment Identifier (MEID) in a CDMA phone, which is embedded in a cellular telephone.

In another embodiment, the user will enter each digit of the unique identifier manually. The user interface device 300 will prompt the user to enter each digit. As the user enters each digit, the user interface device 300 will display the digit on the display 330 such that the user can verify the entered information. Once all the digits are entered, the user interface device 300 will prompt the user to verify the unique identifier. After the unique identifier is verified, the unique identifier will be stored in memory. In an alternative embodiment, the unique identifiers can be stored in the control panel of the security system.

The user will then associate with unique identifier with an authorized person and passcode, e.g., Jane Doe or Jane Doe's cellular phone, at step 210. This association will be used for all subsequent detections of the unique identifier to determine if the unique identifier corresponds to a person authorized to change the status of the security system. The user will program a name of an authorized person. The name will be stored in memory and associated in memory with the unique identifier.

The user can assign at least one function that the authorized person can control, at step 220. Each authorized person can have different control levels or authority. For example, a security officer in a commercial building can have the highest level of authority, i.e., complete control of all functions. An employee might only be able to arm or disarm the security system. In the preferred embodiment, the user can program each function or feature that each authorized person can control. In another embodiment, the user can program a function or feature that an authorized person cannot control. Typically, the control functions will be disarm, arm, arm-away, and away-max.

At step 230, the user will program the detection criterion for each specified control function. In the preferred embodiment, the detection criterion is a period of time in which the host object 10 is brought within a preset range of the target object 20. In this embodiment, the user will program specific time threshold values for each function. For example, the target object 20 will cause the security system to arm if the host object 10 is held within the preset range of the target object 20 for between "0" and "X" seconds. The target object 20 will cause the security system to arm-away if the host object 10 is held within the preset range of the target object 20 for between "X" and "Y" seconds. The target object 20 will cause the security system to disarm if the host object 10 is held within the preset range of the target object 20 between "Y" and "Z" seconds.

In another embodiment, detection criterion can be a number of times that the host object 10 is brought into the preset range of a target object 20 within a predefined period. In this embodiment, the user will program a predefined period and threshold number values for each function. For example, the target object 20 will cause the security system to arm if the host object 10 is held within the preset range of the target object for "A" times in "N" seconds. The target object 20 will cause the security system to arm-away if the host object 10 is held within the preset range of the target object 20 for "B" times in "n" seconds. The target object 20 will cause the security system to disarm if the host object 10 is held within the preset range of the target object 20 for "C" times in "N" seconds. The threshold number values and predefined period will be stored in memory and associated with each function.

Optionally, at step 240, the user can assign access credentials that expire based upon a predetermined parameter. The feature provides several advantages. First, if the host object is misplaced or lost, the ability to control the security system expires and is not indefinite. Second, an employer can control access to the security system based simply by using an expiring access credential. This is particularly useful if there is a high turnover in employment. Furthermore, this feature can be used to track and monitor when an employee enters/leaves a building (track number of times arms and disarms the system). Additionally, this feature allows for an owner of a security system to provide limited access to a security system for houseguests, cleaning persons, repairmen and other parties. In an embodiment, a database of available access credentials can be stored in the near field communication device 15. The target object 20 can randomly activate one of the access credentials periodically. Each access credential would expire after a preset period of time.

The predetermined parameter can be a period of time. For example, access credential can expire daily, weekly, monthly, etc. In the case of repairmen, the access credential can be hourly. Alternatively, the number of times used can be the predetermined parameter. For example, a security officer can program the predetermined parameter as 5 times for the five business days in the week.

Also optional, at step 250, the user can program parameters to determine if the access credential will be automatically renewed or require a manual renewal of access credentials. For example, the access credential can be renewed automatically every Monday.

While it has been described that the programming of the control system 1 occurs in the user interface keypad 300, the programming can occur in any target object 20 such as an arming and disarming station.

FIGS. 4A and 4B illustrate examples of databases that are created in memory in accordance with an embodiment of the invention.

Both databases in FIGS. 4A and 4B will be used for controlling at least one function of the security systems. The database 400 illustrated in FIG. 4A will mainly be used to determine authority, type of authority and access credentials for a particular person or host object 10. The database 420 illustrated in FIG. 4B will be used to determine the intended function or control aspect. As depicted in FIG. 4A, the database 400 includes the unique identifier for the near field communication device 15, the associated name, authorized function, whether the access credential expires (why and when). The database in FIG. 4B includes a list of functions and the corresponding threshold value.

In another embodiment, at least a portion of databases 400 and 420 can be stored in the near field communication device 15. The near field communication device 15, when within the preset range would broadcast the databases 400 and 420 with the identification and the access credential to the target device 20. This has an advantage that if the control system includes multiple target devices 20, the administration of security right can be administrated by bi-directional, two-way communication between the near field communication device 15 and a main target device.

Figure 5:
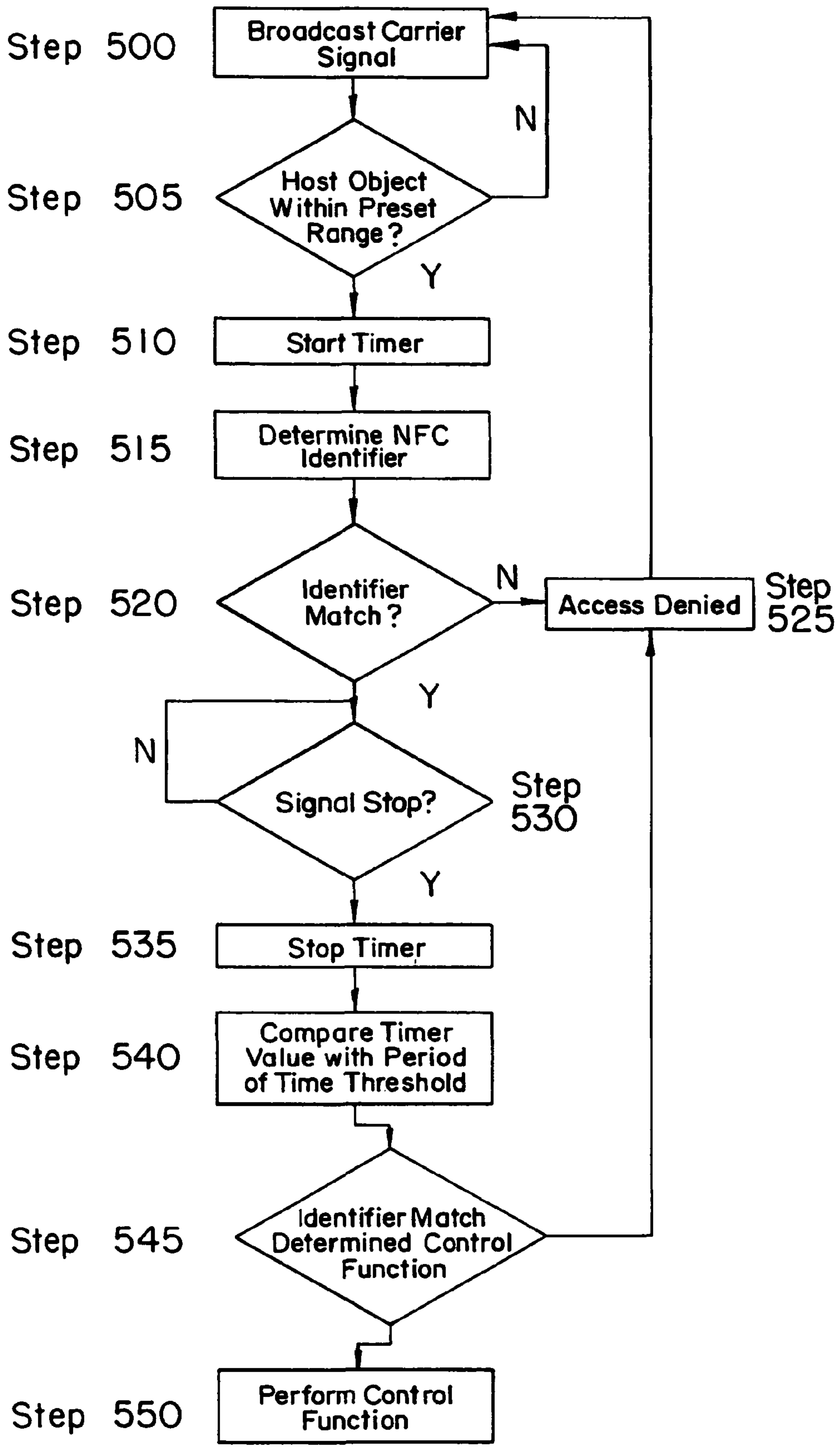
FIG. 5 is a flow chart for the control method in accordance with one embodiment of the invention.

FIG. 5 illustrates control method in accordance with one embodiment of the invention. In this embodiment, the detection criterion for a specific function is a period of time the host object 10 is held within the preset range of the target object 20.

Initially, the target object 20 continuously broadcasts a carrier signal using the near field communication device 25, at step 500. At step 505, the target object 20 determines if a host object 10 is present. If a host device is not present, the target object 20 just broadcasts the carrier signal, i.e., returns to step 500. If a host object 10 is present within the preset range, the target object 20 starts a timer, which is used to determine the time the host object 10 is being held within the preset range, at step 510. The target object 20, using the near field communication device 25, determines the unique identifier for the host object 10, at step 515. The near field communication device 25 filters and modulates the signal and generates the unique identifier for the host object 10. This unique identifier is compared with a list of unique identifiers previously stored, at step 520. If there is no match then control access is denied, at step 525. In an embodiment, a notification of the denial can be sent to a remote monitoring station. This will inform the remote monitoring station that an unauthorized user attempted access to the security system.

If there is a match at step 520, then the target object 20 will determine if the host object 10 has be moved out of the preset range. If the communication from the host object 10 is no longer detected, the host object 10 moved out of the preset distance. In an embodiment, the target object 20 can indicate that the host object 10 moves out of range to notify a user. This indication can be a visual indication such as a flash of light or an audible indication such as a beep or tone.

If host object 10 is still within the preset range, the target object 20 will wait until the host object 10 is moves out of range to determine the intended control function. If it is determined that the host object 10 moved out of the preset range, then the target object 20 will stop the timer, at step 535. The timer value indicates the time that the host object 10 was within the preset range.

The target object 20 will then determine the intended control function, at step 540. The target object 20 will compare the value of the timer with a period of time threshold value previously stored in memory to determine the intended control function by search the database 420. Database 420 includes all intended functions as their corresponding threshold values.

After the intended control function is determined, the target object 20 will determine if the authorized user associated with the unique identifier is authorized to control the intended control function, at step 545. The target object 20 will search the created database 400 for the entry that corresponds with the unique identifier and read out the associated control function. If none of the associated control functions match the intended control function, control access will be denied, at step 525. If one of the associated control functions listed in the database 400 matches, then the target object 20 will cause the security system to be controlled in the intended manner, at step 550.

Typically, the target object 20 will send a corresponding control signal via a data bus to a control panel. The control panel will execute the intended function in accordance with the control signal.

The control signal is a unique passcode that corresponding with the unique identifier. The passcode can be associated with the unique identifier in the database 400. In other words, the target object 20 will convert the unique identifier associated with the host object 10 to a passcode that can be recognized by the control panel.

Figure 6:
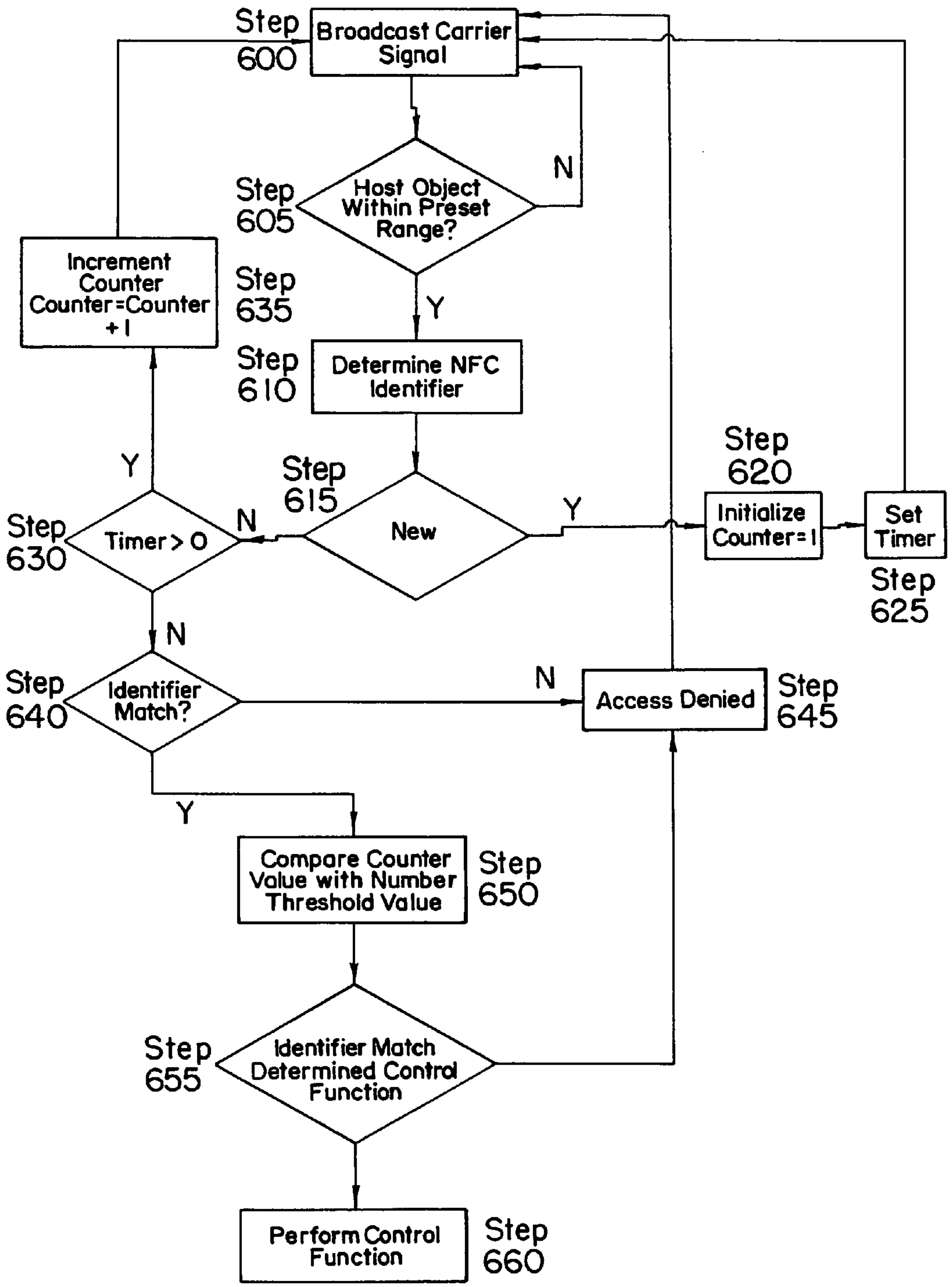
FIG. 6 is a flow chart for the control method in accordance with another embodiment of the invention.

FIG. 6 illustrates control method in accordance with another embodiment of the invention. In this embodiment, the detection criterion for a specific function is the number of times the host object 10 is held within the preset range of the target object 20 within a predefined period of time.

Initially, the target object 20 continuously broadcasts a carrier signal using the near field communication device 25, at step 600. At step 605, the target object 20 determines if a host object 10 is present. If a host device is not present, the target object 20 just broadcasts the carrier signal, i.e., returns to step 600. If a host object 10 is present within a preset range, the target object 20, using the near field communication device 25, determines the unique identifier for the host object 10, at step 610. The target object 20 will then determine if the identification is the first time that the host object 10 has been brought within the preset range, i.e., new cycle, at step 615. If the target object 20 determines that the identification is the start of a new cycle, i.e., first time within the period of time, then the target object 20 will initialize a counter to 1, at step 620 and set the timer to the predefined period of time a step 625. The target object 20 will then wait for the predefined period of time to expire and just broadcast the carrier signal, i.e. return to step 600. If the target object 20 determines that the identification is not the start of a new cycle, i.e., n-th time within the predefined period of time, where n is greater than one, the target object 20 will determine whether the predefined period of time has expired, at step 630. If the predefined period of time did not expire, then the target object 20 will increment a counter by 1, at step 635. The target object 20 will then wait for the predefined period of time to expire and just broadcast the carrier signal, i.e. return to step 600.

If the predefined period of time expires, then the target object 20 determines whether the unique identifier matches a unique identifier previously stored and associated with authorized users in memory, at step 640. If there is no match then control access is denied, at step 645. In an embodiment, a notification of the denial can be sent to a remote monitoring station. This will inform the remote monitoring station that someone that is unauthorized to have access to the security system attempted to gain access.

In another embodiment, the determination in step 640 will occur prior to the determined in step 615.

The target object 20 will then determine the intended control function at step 650. The target object 20 will compare the counter value with a number threshold value previously stored in memory to determine the intended control function by search the database 420.

After the intended control function is determined, the target object 20 will determine if the authorized user associated with the unique identifier is authorized to control the intended control function, at step 655. The target object 20 will search the created database 400 for the entry that corresponds with the unique identifier and read out the associated control function(s). If none of the associated control functions match the intended control function, control access will be denied, at step 645. If one of the associated control functions listed in the database 400 matches, then the target object 20 will cause the security system to be controlled in the intended manner, at step 660.

Figure 7:
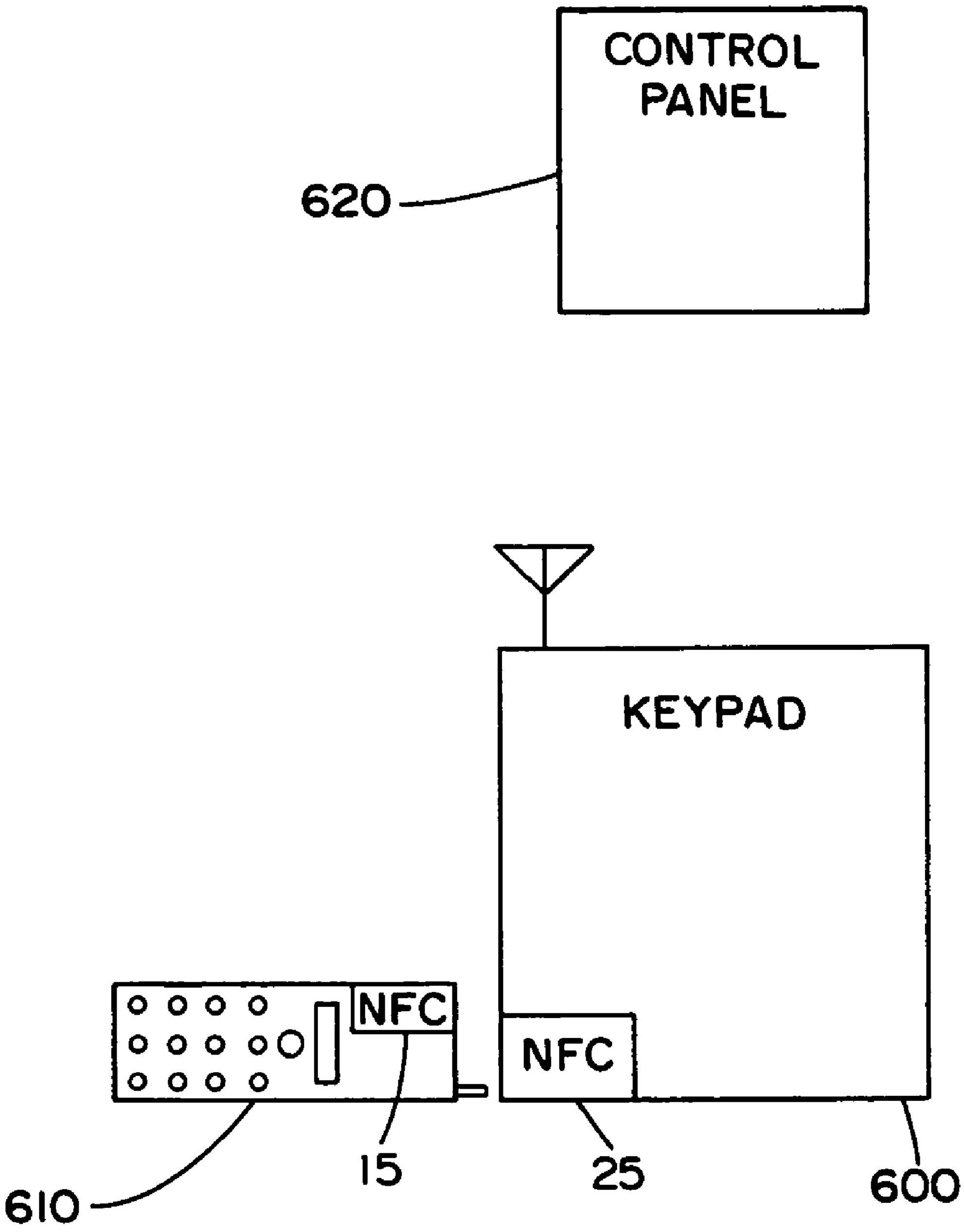
FIG. 7 is an example of the control system of the invention.

FIG. 7 illustrates an example of the security control system according to the invention. As depicted the system include a security system keypad 600 as the target object 20 and a cellular telephone 610 with a smart card as the host object 10. The cellular telephone SIM card can be used to store various identification information. The cellular telephone 610 and security system keypad 600 both include near field communication devices 15 and 25. The system also includes a control panel 620. The security system keypad 600 communicated with the control panel via a wired or wireless connection. The security system keypad 600 is located near the entrance way or door such that the security system can be armed when a user leaves a premises and disarmed quickly when a user enters the premises.

When the cellular telephone 610 is brought within the preset range of the security system keypad 600, the cellular telephone 610 can be used to control the security system such as to arm or disarm the system. For example, to disarm the system, the cellular telephone 610 could be brought within the preset range of the security system keypad 600 for 2 seconds. To arm the system, the cellular telephone 610 could be brought within the preset range of the security system keypad 600 for 1 second.

Figure 8:
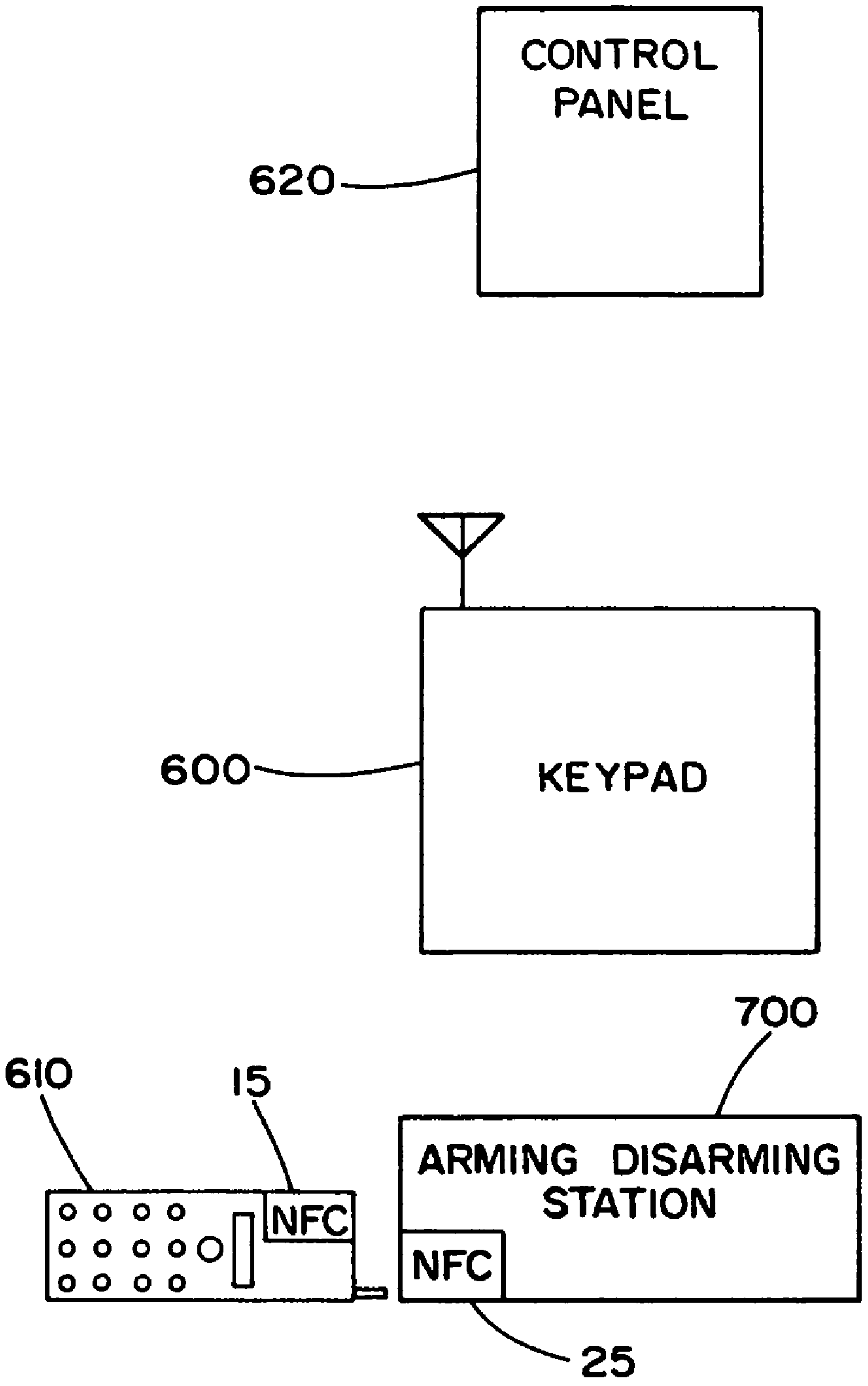
FIG. 8 is a second example of the control system of the invention.

FIG. 8 illustrates another example of the security control system according to the invention. As depicted, the system include a security system keypad 600, arming and disarming station 700 as the target object 20 and a cellular telephone 610 with a smart card (including the IMEI) as the host object 10. The cellular telephone 610 and arming and disarming station 700 both include near field communication devices 15 and 25. The system also includes a control panel 620. The security system keypad 600 and arming and disarming station 700 communicates with the control panel via a wired or wireless connection. The arming and disarming station 700 is located near the entrance way or door such that the security system can be armed when a user leaves a premises and disarmed quickly when a user enters the premises. In this example, the security system keypad 600 can be remotely located from the entranceway or door. This example prevents or deters tampering with the keypad since the keypad can be hidden.

In this example, the arming and disarming station 700 can include memory and a microprocessor for processing information received from the cellular telephone 610 directly. In this example, instead of programming the arming and disarming station 700 directly, i.e., programming the target object 20 as described in FIG. 2, the programming can be done in the security system keypad 600. The programmed information such as unique identifiers, functions and expiration parameters can be then transmitted to the arming and disarming station 700 for storage and later use in signal processing and access determination. Alternatively, the arming and disarming station 700 can just demodulate the signal received from the cellular telephone 610 and transmit the information to the security system keypad 600 for any access determination. In the case of a cellular telephone 610, the target object 20 translates the NFC ID (e.g. IMEI) i.e., unique identifier, to a passcode or data packet that is transmitted over the system bus, or by RF that is recognized by the security system controller.

Figure 9:
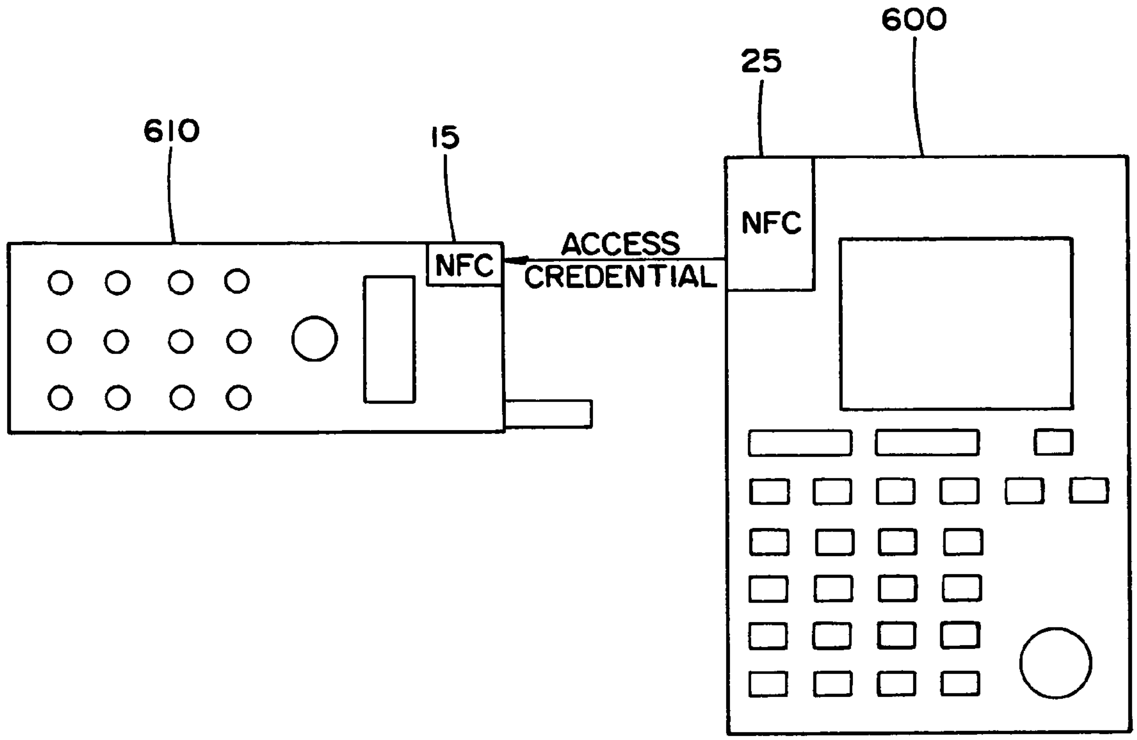
FIG. 9 illustrates a configuration of the control system updating an access credential in a host object in accordance with the invention.

As described above, the access credentials can expire after a predetermined period of time or number of used. After expiration, the access credential can be re-activated or updated automatically or manually. The updated access credential can be written into the memory of the host object 10. The update can simply be an extra bit randomly assigned. FIG. 9 illustrates an example of update transfer according to an embodiment of the invention. According to this example the cellular telephone 610 will acquire the update information from the security system keypad 600 when cellular telephone 610 is within close proximity of the keypad. The update information is modulated into the carrier signal from the security system keypad 600. The cellular telephone 610 will received the modulated carrier signal, filter and demodulate the carrier signal and write the update information into memory. All subsequent uses of the cellular telephone to control the security system, i.e., bringing the cellular telephone within the preset range of the keypad will result in the modulation of the new updated identification being transmit to the security system keypad 600 (target object 20). The update process is initiated when the cellular telephone 610 is brought within the preset range of a target object 20 and the access credential is determined to be expired based upon a predefined criterion, e.g., time period or number of uses.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claim is:

1. A method for controlling a security system using a near field radio frequency communication signal having a preset range transmitted from a host object to a target object associated with the security system comprising the steps of:

detecting a presence of said radio frequency communication signal, said radio frequency communication signal including an access credential;

determining said access credential;

matching said determined access credential with a specific authorized user from a list of authorized users;

the target object detecting a type of modification to a function of said security system of a plurality of modifications based upon a predetermined detection criterion associated with the preset range of the near field signal specifying an association between the modification and a time threshold, said time threshold is a period of time where said host object is brought within the preset range of the target object;

determining if said specified authorized user is authorized to perform said detected type of modification; and performing said type of modification.

2. The method for controlling a security system according to claim 1, wherein said access credential expires after a preset period of time.

3. The method for controlling a security system according to claim 1, wherein said type of modification is arming or disarming said security system.

4. The method for controlling a security system according to claim 1, wherein the step of performing said type of modification comprises the step of: converting said access credential into a user passcode; transmitting said user passcode to a control panel.

5. A method for controlling a security system for receiving remote control signals from a host object, the remote control signals using a near field radio frequency communication signal having a preset range transmitted from the host object to a target object associated with the security system, the method comprising the steps of: programming a list of authorized users; associating an access credential with each of said authorized users; assigning a control authority for a function to each of said authorized users; determining a detection criterion for each function; detecting a presence of a radio frequency communication signal from the host object, said radio frequency communication signal including the access credential; determining said access credential; matching said determined access credential with a specific authorized user from the list of authorized users; the target object detecting the function of said specific authorized user based upon the predetermined detection criterion associated with the preset range of the near field signal, the detection criteria specifying an association between the function and a time threshold, said time threshold is a period of time where said host object is brought within the preset range of the target object; determining if said specified authorized user has the assigned control authority for the function; and performing said function.

6. The method of configuring a security system according to claim 5, further comprising the step of: assigning an expiration time for each of said access credentials.

7. The method of configuring said-a security system according to claim 6, wherein the method further comprises the step of transmitting an updated access credential to said host object.

8. The method of configuring a security system according to claim 5, further comprising the step of: determining the preset range.

9. The method of configuring said-security system according to claim 8, wherein said preset range is within 10 cm.

10. The method of configuring a security system according to claim 5, wherein the step of programming said access credential comprises the step of bringing said host object within the preset range of a target object.

11. The method of configuring spa security system according to claim 5, further comprising the step of broadcasting the list of authorized users, the access credential, the control authority for a function to each of said authorized users and the detection criterion for each function to a host object for storing.

12. The method of configuring said-a security system according to claim 11, wherein the host object includes a near field communication device capable of ISO/IEC 18092.

13. The method of configuring a security system according to claim 12, wherein when the host object is brought within the preset range of a target object, the host object, using the near field communication device, broadcasts the authorized users, the access credential, the control authority for a function to each of said authorized users and the detection criterion for each function and unique identification to said target object.

14. A security system control system comprising a host object having a near field communication device compatible with ISO/IEC 18092 associated with said host object; and a target object having a second near field communication device associated with said target object, said near field communication devices having a preset range that is controlled in advance, wherein said host object and said target object are configured such that, when said host object is brought within a preset distance to said target object defined by a preset range, said near field communication device in said host object transmits a radio frequency field including identification information for said near field communication device and access credentials for controlling said security system, said second near field communication device in said target object receives said radio frequency field and processes said information and identification, said second near field communication device detecting a status change request of a plurality of status change requests based upon a predetermined detection criteria associated with the radio frequency field based upon the preset range the predetermined detection criteria specifying an association between the status change request and a time threshold, said time threshold is a period of time where said host object is brought within the preset range of the target object and where satisfaction of the predetermined detection criteria causes a status of the security system to change only if said host object is authorized to initiate said change.

15. The security system control system of claim 14, wherein said host object is a cellular telephone.

16. The security system control system of claim 14, wherein said host object is a keyfob.

17. The security system control system of claim 14, wherein said target object is a user interface keypad.

18. The security system control system of claim 17, wherein said user interface keypad is positioned proximate to an entrance.

19. The security system control system of claim 18, wherein said target object is an arming and disarming station positioned proximate to an entrance.

20. The security system control system of claim 14, wherein the system further includes a plurality of target objects, one of said plurality of target objects is selected as a main target object for assigning the access credentials and uploading the access credentials and at least one other parameter to said host object, the other of said plurality of target objects causes a status of the security system to change if said host object is authorized to initiate said change determined based upon the assigned access credentials.

* * * * *